(12) United States Patent
Nakano et al.

(10) Patent No.: US 6,271,304 B1
(45) Date of Patent: *Aug. 7, 2001

(54) NON-SWELLING SEALING MATERIAL AND METHOD OF PREPARING THE SAME

(75) Inventors: Yoshinori Nakano; Sukehide Fujimoto, both of Osaka (JP)

(73) Assignee: Sunrise MSI Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/222,993

(22) Filed: Dec. 30, 1998

(30) Foreign Application Priority Data

Jan. 7, 1998 (JP) .................................................. 10-013310

(51) Int. Cl.⁷ ................................ C08J 3/00; C08K 3/00; C08L 75/00; C08G 18/00; C08G 18/08
(52) U.S. Cl. ............................ 524/590; 524/589; 528/44; 528/49
(58) Field of Search .................................... 524/589, 590; 528/44, 49

(56) References Cited

U.S. PATENT DOCUMENTS 4,359,549   11/1982   Gallagher et al. .
4,824,888   4/1989    Emmerling et al. .
5,545,706 * 8/1996    Barksby et al. ......................... 528/49

FOREIGN PATENT DOCUMENTS

4234273A1   4/1993    (DE) .
0289901A2   11/1988   (EP) .
0486881A2   5/1992    (EP) .
0540950A2   5/1993    (EP) .
5-968245    4/1993    (JP) .

OTHER PUBLICATIONS

Abstract of Japanese Patent Publication No. 58125780, dated Jul. 26, 1983.

* cited by examiner

*Primary Examiner*—Patrick D. Niland
(74) *Attorney, Agent, or Firm*—Armstrong, Westerman, Hattori, McLeland & Naughton, LLP

(57) ABSTRACT

1 mole of 4,4'-diphenylmethane diisocyanate is mixed with 2 moles of polyoxypropyelene glycol monoether having mean molecular weight of 2800 while adding 0.03% of tin octylate as a catalyst, and reaction is made at 80° C. for three hours for obtaining a synthetic. This synthetic is employed as a main component and blended with a filler and the like for obtaining a sealing material composite. This composite causes no swelling of a gasket forming a flange part of a trunk lid of an automobile.

12 Claims, 1 Drawing Sheet

NON-SWELLING SEALING MATERIAL AND METHOD OF PREPARING THE SAME

BACKGROUND OF THE INVENTION

1. Field of the Invention

The present invention relates to a sealing material, and more specifically, it relates to a sealing material suitable for filling up a clearance between a coated steel plate and a component forming a gasket in a flange part of a trunk lid of an automobile or the like.

2. Description of the Prior Art

A sealing material, which is employed in various fields, fills up a clearance between a coated steel plate and a component forming a gasket in a flange part of a trunk lid of an automobile, for example, for sealing and rust prevention. FIG. 1 is a sectional view showing such a flange part A hollow-sealing member 2 for sealing a trunk room when closing a trunk lid is integrally formed with a gasket 4. A sealing member 6 fills an inner part of the gasket 4, which is engaged with a coated steel plate 8 of the trunk lid for dipping the forward end of the coated steel plate 8 into the sealing material 6.

The material for the gasket 4 has been mainly prepared from a rubber material such as PVC (polyvinyl chloride), SBR (styrene-butadiene rubber), NR (natural rubber) or CR (chloroprene rubber). Furthemore, EPDM (ethylene-propylene rubber) is generally employed particularly in recent years, while thermoplastic elastomer such as TPO (olefinic elastomer) is regarded as a promising advanced material.

The coated steel plate 8 of the flange part is formed by a baked coated steel plate of melamine, acrylic or melamine acrylic.

The sealing material 6 for filling up the inner part of the gasket 4 must have the following characteristics:

(1) To hold viscosity over a long period after filling up the inner part of the gasket 4;
(2) to have less swelling action of the gasket 4 of synthetic resin or synthetic rubber,
(3) to minimize contamination or swelling of the coated steel plate 8;
(4) to have less self-volume shrinkage factor;
(5) to have no self-foaming or swelling,
(6) to be readily engaged with the coated steel plate 8 of the flange part after filling the inner part of the gasket 4; and
(7) not to ooze out from the gasket 4.

A sealing material for filling a clearance between a coated steel plate and a part forming a gasket in a flange part of an automobile is mainly prepared from a polybutene material or a butyl rubber material. The polybutene sealing material is a composite prepared by blending an adhesive component of polybutene resin with an oil extender which includes a plasticizer, process oil, polypropylene glycol having a hydroxyl group on one or each end and a solvent, and a powder filler.

The butyl rubber sealing material is prepared by dissolving butyl rubber in process oil or a solvent and blending the same with the aforementioned oil extender and a powder filler.

However, when employing the polybutene sealing material, the polybutene itself, and the plasticizer, the process oil, or the solvent which are contained in the oil extender, disadvantageously swells the gasket Furthermore, the plasticizer or the process oil, which are contained in the oil extender, erodes the coated steel plate to swell or contaminate the same. In addition, the sealing material remarkably shrinks due to evaporation of the oil extender or the solvent.

On the other hand, in the butyl rubber sealing material,, the viscosity of the composite increases due to volatilization of the solvent in addition to the aforementioned action of swelling the gasket Thus, the sealing material cannot be readily engaged with the coated steel plate of the flange part Furthermore, the sealing material disadvantageously shrinks due to volatilization of the oil extender or the solvent.

SUMMARY OF THE INVENTION

An object of the present invention is to provide a sealing material, which can maintain its viscosity over a long period without swelling a component of synthetic resin or synthetic rubber.

The inventors have studied deeply to discover that a novel composite, which is absolutely different from the aforementioned general sealing material of polybutene or butyl rubber, solves the aforementioned problems, and were able to complete the present invention. In order to attain the aforementioned object, a non-swelling sealing material according to the present invention is mainly composed of a viscous liquid compound having at least two alkyl ether end groups having a carbon number of 1 to 30 in one molecule and having a urethane bond in its principal chain, and contains a powder filler for compounding.

The inventive sealing material has the maximum technical significance in a point requiring no oil extender swelling a gasket due to employment of the viscous liquid compound having the aforementioned specific chemical structure as the main component The compound forming the main component of the sealing material can maintain viscosity over a long period itself. Furthermore, the sealing material mainly composed of this compound may not be blended with an oil extender required by the conventional sealing material, and the compound itself does not swell a gasket.

According to the present invention, the viscous liquid compound forming the main component of the sealing material has alkyl ether groups on molecular ends with a urethane bond in its principal chain. Such a compound is generally synthesized by urethane bond forming reaction by addition of a compound having an isocyanate group and a monoalcohol compound.

In order to suppress foaming of the sealing material, it is necessary to blend hydroxyl groups to be at least equimolar with the isocyanate groups so that no free isocyanate groups are substantially present in the obtained compound. If isocyanate groups are present in this compound, the sealing material may react with moisture contained in the air to foam. Even if the material composition is so set in the synthesizing process that the hydroxyl groups are in excess of the isocyanate groups, unreacted isocyanate groups may remain in the compound. The aforementioned expression "no free isocyanate groups are substantially present" means that some isocyanate groups may remain in the compound if swelling of the sealing material itself causes no problem by foaming.

Presence of unreacted hydroxyl groups is allowed so far as the sealing material obtained from the compound does not swell a gasket This means that the monoalcohol compound reacted with the compound having the isocyanate groups can be employed in excess of the equimolar state.

A first method of preparing a non-swelling sealing material according to the present invention reacts a low molecular weight polyisocyanate compound having at least two isocyanate groups in one molecule with polyalkylene oxide monoether having a hydroxyl group only on one end in such a molar ratio that the hydroxyl groups are equimolar with or slightly in excess of the isocyanate groups for synthesizing a compound, and thereafter blends the synthesized compound with a powder filler.

The low molecular weight polyisocyanate compound having at least two isocyanate groups in one molecule can be prepared from aliphatic, aromatic or alicyclic low molecular weight polyisocyanate having molecular weight of less than 500.

Such low molecular weight polyisocyanate compound can be prepared from diisocyanate such as 4,4'-diphenylmethane diisocyanate, polyphenylmethane diisocyanate, tolylene diisocyanate, isophorone diisocyanate, hexamethylene diisocyanate, trimethylhexamethylene diisocyanate, m-xylylene diisocyanate, naphthalene diisocyanate, cyclohexanel, 4-diisocyanate, hydrogenated diphenylmethane diisocyanate, hydrogenated xylylene diisocyanate or dicyclohexylmethane diisocyanate, or triisocyanate such as triphenylmethane triisocyanate or tris (isocyanatephenyl)thiophosphate.

The polyalkylene oxide monoether having a hydroxyl group only on one end can be prepared from a compound having a polyalkylene oxide part of its principal chain part consisting of polyether such as polyethylene oxide, polypropylene oxide, polyethylene oxide/polypropylene oxide random copolymer or polytetramethylene oxide, and another ether end group consisting of an alkyl ether group having a carbon number of 1 to 30. In particular, the carbon number of the alkyl ether group is preferably 3 to 8. Such an alkyl ether group may be a methyl ether group, an ethyl ether group, a butyl ether group, an n-hexyl ether group, an n-octyl ether group, a 2-ethyl hexyl ether group or an n-decyl ether group.

In particular, polypropylene oxide mono n-butylether or polypropylene oxide mono n-propylether is preferable.

The molecular weight of the polyalkylene oxide monoether is preferably 1000 to 5000.

A second method of preparing a non-swelling sealing material according to the present invention reacts a compound (hereinafter referred to as an urethane prepolymer) provided with a molecule principal chain part consisting of a polyalkylene oxide structure and having at least two molecule end parts of isocyanate groups with short-chain monoalcohol in such a ratio that hydroxyl groups of the monoalcohol are equimolar with or slightly in excess of the isocyanate groups for synthesizing a viscous liquid compound and thereafter blends the synthesized compound with an additive mainly composed of a powder filler.

Such an urethane prepolymer is preferably prepared from a compound having isocyanate groups on its ends obtained by reacting the aforementioned polyisocyanate compound in excess with polyalkylene oxide polyol having a principal chain part of polyalkylene oxide and ends of hydroxyl groups.

The short-chain monoalcohol employed in the second method is prepared from methyl alcohol, ethyl alcohol, n-prnopyl alcohol, n-butyl alcohol, n-octyl alcohol or n-decyl alcohol.

The powder filler contained in the sealing material composite according to the present invention can be prepared simply or combinably from calcium carbonate, magnesium carbonate, precipitated silica, diatom earth, talc, kaolin, clay, carbon black, bentonite, ferric oxide and/or zinc oxide.

The sealing material composite according to the present invention can contain an additive such as a thixotropic agent, an antioxidant or still another stabilizer so far as the additive does not damage the aforementioned characteristics.

The sealing material according to the present invention, which is mainly composed of the compound maintaining viscosity over a long period itself, may not be blended with an oil extender.

Furthermore, the inventive sealing material may not contain a solvent, whereby the volume shrinkage factor of the sealing material itself can be suppressed.

The foregoing along with other objects, features, aspects and advantages of the present invention will become more apparent from the following detailed description of the present invention when taken in conjunction with the accompanying drawing.

DESCRIPTION OF THE PREFERRED EMBODIMENTS

Figure 1:
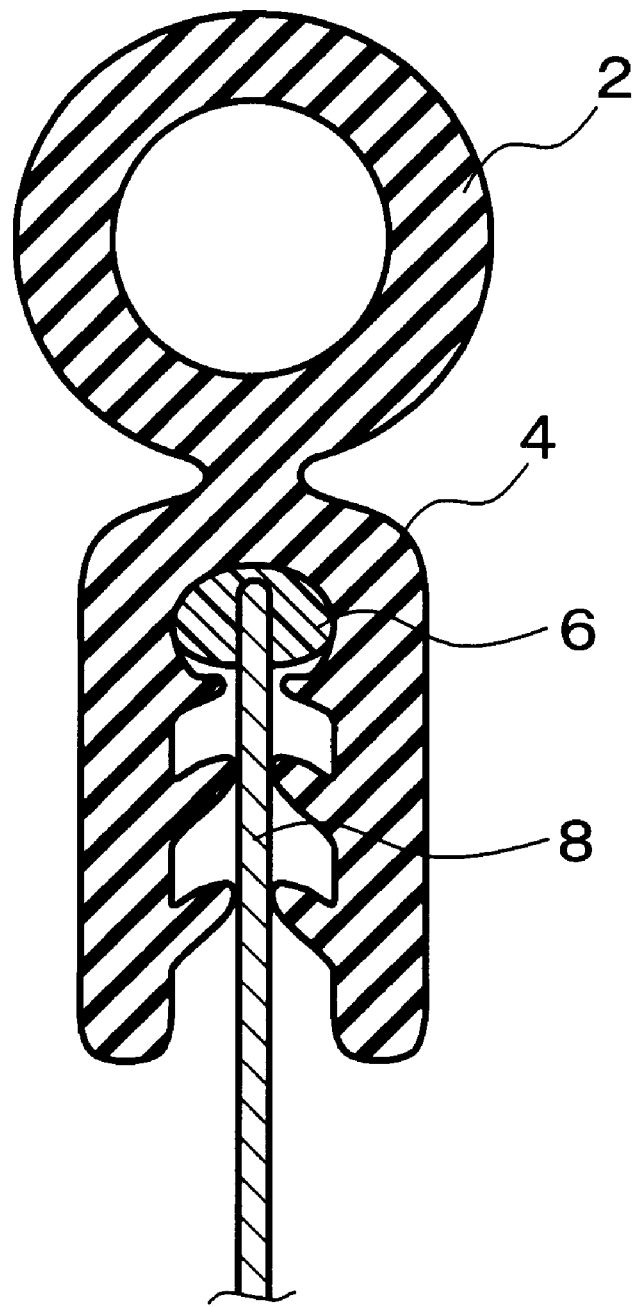
FIG. 1 is a sectional view schematically showing a flange part of a trunk lid of an automobile to which the inventive sealing material is applied.

While Examples of the present invention are now described, the present invention is not restricted to these Examples.

In Examples of the present invention, the coefficient of volume swelling of each gasket was measured using the following test method: A gasket test piece (molded into 25 mm by 25 mm with a thickness of 2 to 3 mm) whose volume was previously measured was dipped in a sealing material and held at 70° C. for 24 hours. Then the test piece was cooled to the room temperature and thereafter taken out from the sealing material, and part of the sealing material adhering to the test piece was quickly wiped out with n-hexane. The volume of the test piece was immediately measured again. The coefficient of volume swelling of the test piece was obtained as follows:

$$\frac{(V2-V1)}{V1} \times 100(\%)$$

where V1 represents the volume of the test piece not yet dipped in the sealing material, and V2 represents the volume of the test piece after being dipped in the sealing material and held at 70° C. for 24 hours.

The volume shrinkage factor of the sealing material was measured in accordance with the method (1) under paragraph 10.3, JISK-6830, after dried at 20° C. for seven days.

The solid component of the sealing material was measured in accordance with the method under paragraph 6, JISK-6830.

EXAMPLE 1

4,4'-diphenylmethane diisocyanate was mixed into polyoxypropylene glycol monoether [New Pole LB3000 (trade name) by Sanyo Chemical Industries, Ltd.] having mean molecular weight of 2800 in a molar ratio of 1:2 (the molar ratio of isocyanate groups to hydroxyl groups was 1:1) with the addition of 0.03% of tin octylate, and the mixture was reacted at 80° C. for three hours for obtaining a synthetic. In this synthetic, all isocyanate groups of the 4,4'-diphenylmethane diisocyanate were reacted.

The viscosity of this synthetic measured with a BS viscometer (with No. 4 rotor at 10 rpm) was 44 Pa·s (44000 cps).

This synthetic was employed as a main component and blended with a filler etc. shown below to obtain a sealing material composite according to the present invention. The blending composition (weight ratio) is as follows:

| Synthetic | 100 |
|---|---|
| Thixotropic Agent (bentonite) | 1.4 |
| Oleic Acid | 1.8 |
| Calcium Carbonate | 64 |
| Clay | 64 |

This sealing material composite exhibited no foaming after being heated at 100° C. for 24 hours.

Table 1 shows characteristics of this sealing material composite (hereinafter referred to as Example 1) and conventional composites of polybutene and butyl rubber after filling clearances of gaskets of EPDM and receiving melamine baked coated steel plates.

EXAMPLE 2

Urethane prepolymer (PU-8002 (trade name) by YSK Co., Ltd.), which has an isocyanate group quantity of 1.30% and mean molecular weight of 8000 to 9000, and n-propyl alcohol were mixed with each other so that the equivalent ratio of isocyanate groups to hydroxyl groups was 1:1 with the addition of 0.03% of tin octylate, and the obtained mixture was reacted at 80° C. for three hours for obtaining a synthetic. The viscosity of this synthetic measured with a BS viscometer (with No. 7 rotor at 10 rpm) was 300 Pa·s (300000 cps) at 20° C.

This synthetic was employed as a main component and blended with a filler etc. shown below to obtain a sealing material composite according to the present invention. The blending composition (weight ratio) is as follows:

| Synthetic | 100 |
|---|---|
| Thixotropic Agent (bentonite) | 1.4 |
| Oleic Acid | 1.8 |
| Calcium Carbonate | 32 |
| Clay | 96 |

Table 1 also shows characteristics of this sealing material composite (hereinafter referred to as Example 2) and conventional composites of polybutene and butyl rubber after filling clearances of gaskets of EPDM and receiving melamine baked coated steel plates.

TABLE 1

|  | Example 1 | Example 2 | Comparative Sample Polubutene | Comparative Sample Butyl Rubber |
|---|---|---|---|---|
| Long-Term Viscosity Holdability | ○ | ○ | × | Δ |
| Non-Swelling Property | ○ | ○ | Δ | × |
| Volume Shrinkage | ○ | ○ | × | × |
| Contamination of Coated Steal Plate | ○ | ○ | ○ | ○ |
| Swelling of Coated Steal Plate | ○ | ○ | ○ | ○ |
| Steal Plate Receivability | ○ | ○ | Δ | × |
| Coated Surface Preservability | ○ | ○ | ○ | ○ |

Referring to Table 1, long-term viscosity holdability of each sample was evaluated after heating the sealing material at 80° C. for 10 days under the following reference:

○ . . . substantially unchanged as compared with initial state

Δ . . . viscosity slightly reduced as compared with initial state

× . . . viscosity considerably reduced as compared with initial state

The non-swelling property was evaluated under the following reference:

○ . . . swelled no gasket

Δ . . . slightly swelled gasket

× . . . considerably swelled gasket

The volume shrinkage factor of the sealing material was evaluated as follows:

○ . . . not more than 1%

× . . . in excess of 5%

The steel plate receivability, showing easiness of receiving a coated steel plate in the gasket filled with the sealing material composite, was evaluated under the following reference:

○ . . . readily receivable

Δ . . . slightly readily receivable

× . . . hard to receive

As for the coated surface preservability of the coated steel plate received in the gasket filled with the sealing material, ○ indicates that rust was not exhibited.

Table 2 shows coefficients of volume swelling of the gaskets filled with the sealing materials according to Examples 1 and 2 and the comparative samples of polybutene and butyl rubber respectively. Two types of gaskets were used: EPDM, most generally employed in recent years, and TPO, regarded as a promising advanced material.

TABLE 2

|  | Type of Gasket | |
|---|---|---|
| Sealing Material | EPDM | TPO |
| Example 1 | −2% | −4% |
| Example 2 | −1% | −3% |
| Polybutene | +12% | +20% |
| Butyl Rubber | +30% | +15% |

Table 3 shows volume shrinkage factors and solid components of the inventive and comparative samples respectively.

TABLE 3

| Sealing Material | Volume Shrinkage Factor | Solid Component |
|---|---|---|
| Example 1 | 0% | 100.0% |
| Example 2 | 0% | 100.0% |
| Polybutene | 8% | 92.7% |
| Butyl Rubber | 10% | 90.4% |

The results shown in Table 3 indicate the correlation between the solid components and the volume shrinkage factors.

It is understood from the above results that the inventive sealing material is superior in characteristic to the conventional ones.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A non-swelling, sealing material which maintains viscosity comprising:
   a viscous liquid compound which is substantially non-reactive having at least two alkyl ether end groups having a carbon number of 3 to 8 in one molecule, a urethane bond in a principal chain of the viscous liquid compound and a powder filler contained therein for compounding,
   wherein said non-swelling, sealing material does not contain an oil extender, and is obtained by reaction between a low molecular weight polyisocyanate compound having at least two isocyanate groups in one molecule and polyalkylene oxide monoether having a hydroxyl group only on one end,
   said polyalkylene oxide monoether having a molecular weight of 1000 to 5000 and is prepared from a compound having at least one alkyl ether end group with a carbon number of 3 to 8, said the alkyl ether group is a member selected from the group consisting of a methyl ether group, an ethyl ether group, a butyl ether group, a n-hexyl ether group, a n-octyl ether group, a 2-ethyl hexyl ether group and a n-decal ether group.

2. The non-swelling sealing material in accordance with claim 1, wherein
   said viscous liquid compound is obtained by reaction between a compound having a molecule principal chain part consisting of a polyalkylene oxide structure with at least two molecular end parts of isocyanate groups and short-chain monoalcohol.

3. The non-swelling sealing material in accordance with claim 2, wherein
   said polyalkylene oxide is polypropylene oxide.

4. The non-swelling sealing material in accordance with claim 1, wherein
   said polyalkylene oxide is polyethylene oxide.

5. The non-swelling sealing material in accordance with claim 2, wherein
   said polyalkylene oxide is polypropylene oxide.

6. The non-swelling sealing material in accordance with claim 2, wherein
   said polyalkylene oxide is polyethylene oxide.

7. A method of preparing a non-swelling sealing material by reacting a low molecular weight polyisocyanate compound having at least two isocyante groups in one molecule with polyalklene oxide monoether having a hydroxyl group only in one end in such a molar ratio that said hydroxyl group is equimolar with or slightly in excess of said isocyanate groups for synthesizing a compound, and thereafter blending said synthesized compound with a power filler
   said polyalkylene oxide monoether having a molecular weight of 1000 to 5000 and is prepared from a compound having at least one alkyl ether end group with a carbon number of 3 to 8, said the alkyl ether group is a member selected from the group consisting of: a methyl ether group, an ethyl ether group, a butyl ether group, a n-hexyl ether group, a n-octyl ether group, a 2-ethyl hexyl ether group and a n-decal ether group.

8. A method of preparing, a non-swelling sealing material by reacting a compound having at least two alkyl ether end groups having a carbon number of 3 to 8 in one molecule with a molecule principal chain part consisting of a polyalkylene oxide structure and at least two molecule end parts of isocyanate groups with short-chain monoalcohol is such a molar ratio that a hydroxyl group of said monoalcohol is equimoloar with or slightly in excess of said isocyanate groups for synthesizing a viscous liquid compound, and thereafter blending said synthesized compound with a power filler
   said polyalkylene oxide is a polyalkylene oxide monoether having a molecular weight of 1000 to 5000 and is prepared from a compound having at least one alkyl ether end group with a carbon number of 3 to 8 said the alkyl ether group is a member selected from the group consisting of: a methyl ether group, an ethyl ether group, a butyl ether group, a n-hexyl ether group, a n-octyl ether group, a 2-ethyl hexyl ether group and a n-decal ether group.

9. The method of preparing a non-swelling sealing material in accordance with claim 7, wherein said polyalkylene oxide is polypropylene oxide.

10. The method of preparing a non-swelling sealing material in accordance with claim 7, wherein
    said polyalkylene oxide is polyethylene oxide.

11. The method of preparing a non-swelling sealing material in accordance with claim 8, wherein
    said polyalkylene oxide is polypropylene oxide.

12. The method of preparing a non-swelling sealing material in accordance with claim 8, wherein
    said polyalkylene oxide is polyethylene oxide.

* * * * *